United States Patent
Yoon et al.

(10) Patent No.: US 10,285,039 B2
(45) Date of Patent: May 7, 2019

(54) WEARABLE DEVICE AND COMMUNICATION METHOD USING THE WEARABLE DEVICE

(71) Applicant: SAMSUNG ELECTRONICS CO., LTD., Suwon-si (KR)

(72) Inventors: Seung Keun Yoon, Seoul (KR); Sang Joon Kim, Hwaseong-si (KR); Chang Mok Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/899,449

(22) PCT Filed: May 8, 2014

(86) PCT No.: PCT/KR2014/004088
§ 371 (c)(1),
(2) Date: Dec. 17, 2015

(87) PCT Pub. No.: WO2014/204092
PCT Pub. Date: Dec. 24, 2014

(65) Prior Publication Data
US 2016/0143079 A1 May 19, 2016

(30) Foreign Application Priority Data

Jun. 17, 2013 (KR) .................. 10-2013-0068918

(51) Int. Cl.
*G06F 1/16* (2006.01)
*G06F 3/01* (2006.01)
(Continued)

(52) U.S. Cl.
CPC ............ *H04W 8/005* (2013.01); *G06F 1/163* (2013.01); *G06F 1/1698* (2013.01); *G06F 3/015* (2013.01);
(Continued)

(58) Field of Classification Search
CPC ...................................................... H04W 4/80
See application file for complete search history.

(56) References Cited

U.S. PATENT DOCUMENTS

| | | | |
|---|---|---|---|
| 5,832,296 | A | 11/1998 | Wang et al. |
| 6,250,557 | B1 | 6/2001 | Forslund et al. |

(Continued)

FOREIGN PATENT DOCUMENTS

| | | |
|---|---|---|
| CN | 102346431 A | 2/2012 |
| CN | 102349037 A | 2/2012 |

(Continued)

OTHER PUBLICATIONS

International Search Report dated Aug. 26, 2014 in counterpart International Application No. PCT/KR2014/004088 (2 pages in English, 2 pages in Korean).

(Continued)

*Primary Examiner* — Hsinchun Liao
(74) *Attorney, Agent, or Firm* — NSIP Law

(57) ABSTRACT

A wearable device and a communication method using the wearable device may include recognizing a gesture of a user by sensing at least one of a motion and a biosignal that occur in or around a portion of the user to which the wearable device is attached. A wireless communication connection is established for the wearable device with at least one of an external device, an internal device, or another wearable device based on the recognized gesture. Wireless communication is performed with at least one of the external device and the internal device with which the wireless communication connection is established.

28 Claims, 6 Drawing Sheets

(51) Int. Cl.
*H04W 4/21* (2018.01)
*H04W 4/80* (2018.01)
*H04W 8/00* (2009.01)
*H04W 12/06* (2009.01)
*G06F 3/0346* (2013.01)

(52) U.S. Cl.
CPC ............ *G06F 3/017* (2013.01); *G06F 3/0346* (2013.01); *H04W 4/21* (2018.02); *H04W 4/80* (2018.02); *H04W 12/06* (2013.01)

(56) References Cited

U.S. PATENT DOCUMENTS

| | | | |
|---|---|---|---|
| 8,014,733 | B1 | 9/2011 | Gailloux et al. |
| 2007/0188323 | A1 | 8/2007 | Sinclair et al. |
| 2008/0001735 | A1* | 1/2008 | Tran .................. G06F 19/3418 340/539.22 |
| 2009/0096746 | A1 | 4/2009 | Kruse et al. |
| 2009/0241171 | A1 | 9/2009 | Sunwoo et al. |
| 2009/0265470 | A1 | 10/2009 | Shen et al. |
| 2009/0326406 | A1 | 12/2009 | Tan et al. |
| 2010/0066664 | A1 | 3/2010 | Son et al. |
| 2010/0156676 | A1 | 6/2010 | Mooring et al. |
| 2011/0018731 | A1 | 1/2011 | Linsky et al. |
| 2011/0092155 | A1 | 4/2011 | Piemonte et al. |
| 2011/0148669 | A1 | 6/2011 | Kang et al. |
| 2011/0195665 | A1 | 8/2011 | Friedlaender |
| 2011/0247056 | A1 | 10/2011 | Lee |
| 2011/0312311 | A1 | 12/2011 | Abifaker et al. |
| 2012/0097719 | A1 | 4/2012 | O'Neill |
| 2012/0139708 | A1 | 6/2012 | Paradiso et al. |
| 2012/0290682 | A1 | 11/2012 | Ohki |
| 2013/0090065 | A1 | 4/2013 | Fisunenko et al. |
| 2013/0185453 | A1* | 7/2013 | Louie ...................... E04C 1/395 709/231 |
| 2014/0320387 | A1* | 10/2014 | Eriksson ................. G06F 3/017 345/156 |
| 2014/0368538 | A1* | 12/2014 | Ratcliff .................. G06Q 50/10 345/633 |

FOREIGN PATENT DOCUMENTS

| | | |
|---|---|---|
| EP | 0 823 082 B1 | 5/2002 |
| KR | 10-2006-0069985 A | 6/2006 |
| KR | 10-2006-0078463 A | 7/2006 |
| KR | 10-2007-0099887 A | 10/2007 |
| KR | 10-2009-0061179 A | 6/2009 |
| KR | 10-2010-0074461 A | 7/2010 |
| KR | 10-2011-0063075 A | 6/2011 |
| WO | WO 2011/103684 A1 | 9/2011 |

OTHER PUBLICATIONS

Partial Supplementary European Search Report dated Jan. 23, 2017, in counterpart European Application 14813874.6 (8 pages, in English).

Extended European Search Report dated Apr. 7, 2017, in corresponding European Application No. 14813874.6 (21 pages, in English).

Chinese Office Action dated Apr. 4, 2018 in counterpart Chinese Patent Application No. 201480033151.5 (27 pages, in Chinese with English translation).

* cited by examiner

WEARABLE DEVICE AND COMMUNICATION METHOD USING THE WEARABLE DEVICE

CROSS-REFERENCE TO RELATED APPLICATIONS

This application is a U.S. National Stage Application of International Application No. PCT/KR2014/004088, filed on May 8, 2014, which claims the benefit under 35 USC 119(a) and 365(b) of Korean Patent Application No. 10-2013-0068918, filed on Jun. 17, 2013, in the Korean Intellectual Property Office.

TECHNICAL FIELD

The following description relates to a wearable device and a communication method using the wearable device.

RELATED ART

Currently, interest in the use of a wearable device is increasing. Such a wearable device refers to a device that is fabricated to be wearable around a body or on top of clothes of a user. For example, a wearable device may include an electronic device that is fastened to a user by a band, strap, or other form of attachment. Such a wearable device incorporates miniaturization and weight lightening technologies. By using small, light wearable devices, such devices are highly portable. Because of the portability, a user may use the device at the user's convenience in a mobile environment.

Accordingly, the wearable device may be present with the user at all times even though the user is participating into a predetermined activity, such as a physical activity, and may be used by the user at all times during such an activity. Each time the wearable device is used, the wearable device may provide information to the user by implementing an instruction. For example, the instruction may be received from the user or from another source, such as another device, which may or may not also be a wearable device. Various types of wearable devices, such as a wearable device for clothes and a wearable device for accessories, for example, may be used. In these contexts, the wearable device may be contained in or attached to the clothes or the accessories. Further, the wearable device described above is potentially usable in a variety of fields, such as a fashion and a medical field, for example. However, these are only examples and potential application fields. The variety of uses of the wearable device is likely to be even broader in the future.

DETAILED DESCRIPTION

Solutions

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication method using a wearable device includes recognizing a gesture of a user by sensing at least one of a motion and a biosignal that occur in or around a portion of the user to which the wearable device is attached, and establishing a wireless communication connection for the wearable device with at least one of an external device and an internal device based on the recognized gesture.

The method may further include performing wireless communication by the wearable device with the at least one of the external device and the internal device with which the wireless communication connection is established.

The establishing may include identifying a predetermined gesture that is mapped to the recognized gesture, and establishing the wireless communication connection with at least one of the external device and the internal device based on the predetermined gesture, wherein the predetermined gesture corresponds to at least one function set to be executed in response to the recognized gesture.

The method may further include recognizing the external device to perform the wireless communication with the wearable device.

The recognizing of the external device may include searching for at least one external device to perform wireless communication to identify a found at least one external device, and selecting, from among the found at least one external device, an external device to perform the wireless communication with the wearable device.

The method may further include setting the wearable device to perform the wireless communication with the external device based on the recognized gesture.

The selecting may include selecting, from among the found at least one external device, an external device to perform the wireless communication with the wearable device based on the recognized gesture.

The establishing may include identifying, from among a plurality of communication schemes, a communication scheme used to perform the wireless communication with at least one of the external device and the internal device based on the recognized gesture, and establishing the wireless communication connection with the at least one of the external device and the internal device based on the identified communication scheme.

The establishing may include identifying data used to perform the wireless communication with at least one of the external device and the internal device based on the recognized gesture, and establishing the wireless communication connection with the at least one of the external device and the internal device based on the identified data.

The establishing may include obtaining information used or a wireless communication connection between the external device and the internal device based on the recognized gesture, and establishing the wireless communication connection between the external device and the internal device based on the obtained information to enable the wireless communication between the external device and the internal device.

The performing may include selecting data received from the external device to be stored in the internal device.

The performing may include loading data from the internal device, and performing the wireless communication with the external device based on the loaded data, wherein the loaded data comprises information associated with at least one of a user of the wearable device, establishment of the wireless communication connection, the wearable device, and the internal device.

The recognizing may include authenticating the user based on the biosignal, and recognizing the gesture of the user by sensing the motion and the biosignal when the user is authenticated.

The wireless communication with the external device may be near field communication between the wearable device and the external device.

The method may further include feeding back, to the user, in a visual, auditory, or tactile manner, information associated with at least one of a function corresponding to the recognized gesture, a state of wireless communication with at least one of the external device and the internal device, the wearable device, the external device, and the internal device.

The recognizing may include sensing the motion using at least one of an acceleration sensor, a gyro sensor, and a camera.

The recognizing may include sensing the biosignal using at least one of an electromyogram (EMG) sensor, an electrocardiogram (ECG) sensor, an electroencephalogram (EEG) sensor, and a temperature sensor.

In another general aspect, a non-transitory computer-readable storage medium stores a program for a communication method using a wearable device, the program comprising instructions for causing a computer to perform the method discussed above.

In another general aspect, a wearable device includes a gesture recognizer configured to recognize a gesture of a user by sensing at least one of a motion and a biosignal that occur in or around a portion of the user to which the wearable device is attached, and a wireless communication connection establisher configured to establish a wireless communication connection for the wearable device with at least one of an external device and an internal device based on the recognized gesture.

The wearable device may further include a wireless communication performer configured to perform wireless communication by the wearable device with the at least one of the external device and the internal device with which the wireless communication connection is established.

The wearable device may further include an external device recognizer configured to recognize the external device to perform the wireless communication with the wearable device.

In another general aspect, a communication method using a first wearable device, includes recognizing a gesture of a user by sensing at least one of a motion and a biosignal that occur in or around a portion of the user to which the first wearable device is attached, searching for a second wearable device to identify a found second wearable device, and establishing a wireless communication connection between the first wearable device and the second wearable device.

The method may further include performing wireless communication by the first wearable device with the second wearable device.

The establishing may include identifying, from among a plurality of communication schemes, a communication scheme used to perform the wireless communication with the second wearable device based on the recognized gesture, and establishing the wireless communication connection with the second wearable device based on the identified communication scheme.

The establishing may include identifying data used to perform the wireless communication with the second wearable device based on the recognized gesture, and establishing the wireless communication connection with the second wearable device based on the identified data.

The wireless communication between the first wearable device and the second wearable device may be near field communication between the first wearable device and the second wearable device.

Other features and aspects will be apparent from the following detailed description, the drawings, and the claims.

Figure 1:
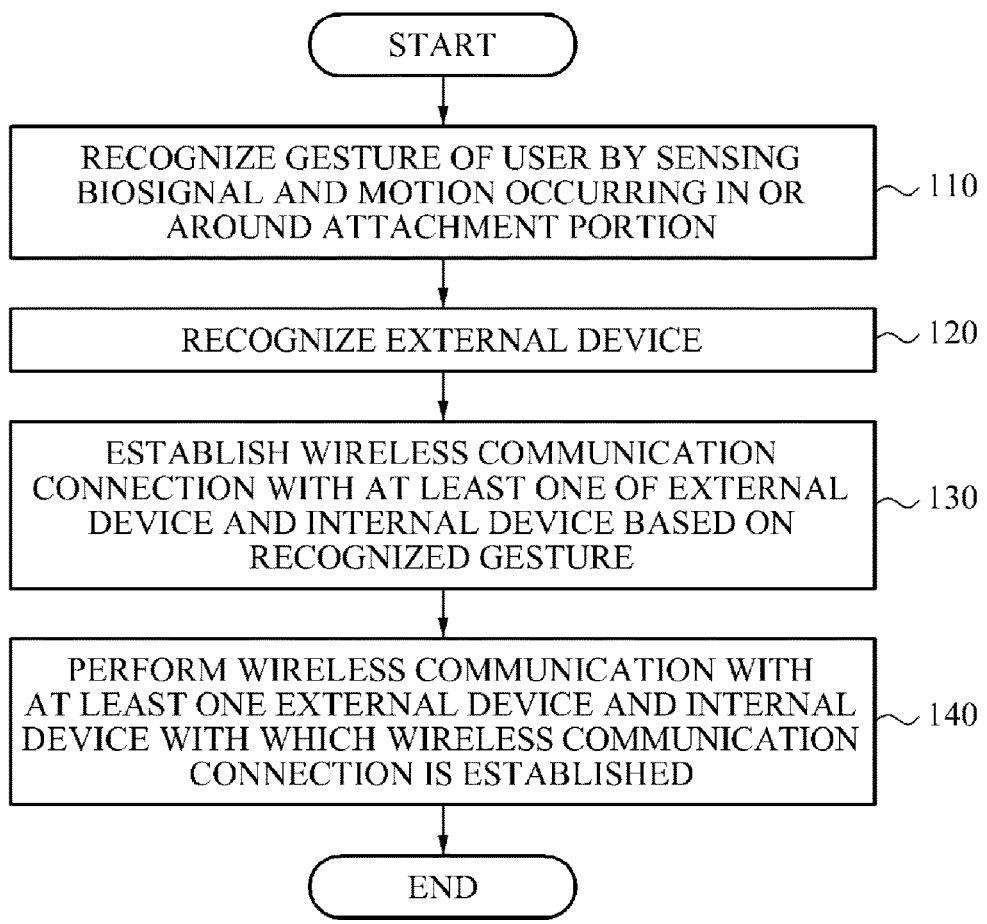
FIG. 1 is a flowchart illustrating an example of a communication method using a wearable device, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

MODE

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a communication method using a wearable device, according to an embodiment.

Referring to FIG. 1, in operation 110, the method recognizes a gesture of a user by sensing a motion and a biosignal that occur in or around a portion of the user's body to which the wearable device is attached. In this embodiment, the wearable device is attached to a portion of a body of the user. For example, a wrist-type wearable device is attached to a wrist of the user, and a glasses-type wearable device is attached to a head of the user. In these examples, a wrist-type wearable device may be attached to a wrist of the user by a band that fastens the device to the wrist of the user, or the glasses-type wearable device may be attached to head of the user using traditional frames that hold the device in front of the eyes of a user by resting lenses on the bridge of the user's nose and anchoring the lenses on the user's ears. However, these are only examples and wearable devices may be situated in other places and supported in other places as well.

In embodiments, the user moves a region corresponding to or surrounding the portion to which the wearable device is attached. For example, in the case of a wrist type wearable device, the user may move his or her hand, wrist, fingers, arms, or even torso. Such movement leads to the movement of wearable device. As another example, in the case of a glasses-type wearable device, the user may move his or her neck or facial muscles. However, in the case of a glasses-type wearable device, an embodiment may track the movement of the user's eyes, even though the glasses-type wearable device is likely not in direct contact with the glasses. Tracking the movement of the user's eyes may be featured in such an embodiment because it may provide information that allows the wearable device to provide a more effective interface to the user.

A biosignal may occur in or around the portion of the user to which the wearable device is attached. In operation 110, the motion and/or the biosignal occurring in or around the portion where the wearable device is attached are sensed. By sensing the motion and/or the biosignal, the embodiment is able to gather data about the user that it interprets to infer what the user would like the wearable device to do.

In an embodiment, the wearable device includes a motion sensing device and/or a biosignal sensing device. The motion sensing device senses a motion occurring in or around an attachment portion. For example, the motion sensor includes at least one of an acceleration sensor, a gyro sensor, and a camera. By using such sensors, the motion sensing device is able to gather information that characterizes the motion of the user.

Similarly, the biosignal sensing device senses a biosignal occurring in or around the attachment portion. In an embodiment, the biosignal sensing device includes at least one of an electromyogram (EMG) sensor, an electrocardiogram (ECG) sensor, an electroencephalogram (EEG) sensor, and a temperature sensor. Such sensors measure electrical signals or thermal energy that provides information about the physiology and biological activity of a user. Accordingly, in operation 110, the motion of body parts of the user occurring in or around the portion of the user to which the wearable device is attached is sensed using the motion sensing device, and the biosignal occurring in or around the portion of the user to which the wearable device is attached is sensed using the biosignal sensing device. In an embodiment, after such information is gathered, a gesture input from the user is recognized based on the sensed motion and biosignal. For example, the recognized gesture input indicates an action the user would like the wearable device to take, or another instruction or input from the user to the wearable device.

For example, in a case in which the wearable device is provided as a wrist-type wearable device, a motion of a wrist or an arm is sensed using at least one of an acceleration sensor and a gyro sensor, and an EMG signal according to a muscular contraction or relaxation of the wrist is sensed using an EMG sensor in operation 110. By analyzing information provided by these sensors, an embodiment is able to infer characteristics of how the user moves his or her wrist. For example, when the user turns his or her wrist clockwise or counterclockwise, an acceleration speed at which the wrist moves is sensed using the acceleration sensor, an angular velocity at which the wrist turns is sensed using the gyro sensor, and an EMG signal of contracted and relaxed muscles among the muscles of the wrist is sensed using the EMG sensor. A gesture of the user turning the wrist clockwise or counterclockwise is recognized based on the sensed acceleration speed, angular velocity, and EMG signal. As will be discussed further, recognized gestures are interpreted by the wearable device as inputs and/or commands from the user to the wearable device.

As another example, in a case in which the wearable device is provided as a glasses-type wearable device, the user may move his or her head up and down. In this example, in operation 110, a motion of the head is sensed using a camera built into or attached to the glasses-type wearable device. In this example, additionally, brainwaves of the user are sensed using an EEG sensor. Such an EEG sensor may be included in the glasses-type wearable device or attached to the user in a way to monitor electrical signals that are representative of the brain activity of the user. Accordingly, in an example where the wearable device is a glasses-type device, a gesture of the user is recognized based on the sensed motion of the head and brainwaves of the user.

As another example, the wearable device is provided as a clothes-type wearable device, such that the wearable device is attached to user at some location on the outside or inside of the user's clothing. For example, for such a clothes-type wearable device, a motion of the user is sensed using at least one of an acceleration sensor and a gyro sensor, and an ECG signal according to the motion of the user is sensed using an ECG sensor or the temperature of a portion moved by the user may be sensed using a temperature sensor in operation 110. Because the ECG signal provides information about the cardiovascular system of the user and because the temperature sensor provides information about the body temperature of the user, these sensors provide information about the physiology of the user as a biosignal that is monitored by the wearable device. Accordingly, for a clothes-type wearable device, a gesture of the user is recognized based on a biosignal, such as the ECG signal and the body temperature, and the sensed motion of the user.

Further, in operation 110, in an embodiment, whether a gesture is input from an authorized user is verified based on a biosignal. As discussed above, various sensors receive information about a biosignal associated with a user. For example, a specific user may be associated with a particular EEG or ECG signal pattern. The embodiment analyzes the biosignal generated by the user. If the biosignal matches the characteristics of an authorized user, the authorized user is authenticated, and if there is no match, then no authentication occurs.

When the user is authenticated, the gesture is recognized by sensing the motion and the biosignal. Conversely, when the user is not authenticated, the input gesture is not recognized. Performing such an authentication operation helps ensure that only a user who is entitled to use the wearable device is allowed to do so. Since each user has a different biosignal with different, recognizable characteristics, in an embodiment the communication method using the wearable device is performed only in a case in which an authorized user wears the wearable device. However, the authentication is optional, and in another embodiment a gesture from any user is recognized, irrespective of whether or not the user is an authorized user.

For example, in a case in which the wearable device is provided as the wrist-type wearable device, a thickness of a wrist of a user wearing the wearable device is sensed using an EMG sensor or another type of sensor that measures wrist thickness included in the wearable device in operation 110. In this example, information associated with the wrist thickness of an authorized user is stored in the wearable device before the user attempts to use the wearable device, and the stored wrist thickness and the sensed wrist thickness may be compared.

When the stored wrist thickness and the sensed wrist thickness match, the user wearing the wearable device is determined to be an authorized user. The stored wrist thickness and the sensed wrist thickness may be determined to match if they are the same, or may be determined to match if the difference between the stored wrist thickness and the sensed wrist thickness are within a predetermined difference from one another. Subsequently a gesture of the user may be recognized by sensing a motion and a biosignal because the wrist thicknesses indicate that the user is an authorized user. Conversely, when the stored wrist thickness and the sensed wrist thickness do not match, the user is determined not to be an authorized user and the gesture of the user is recognized.

In operation 120, the method recognizes an external device that is to perform wireless communication with the wearable device. For example, the external device refers to a device where the user of the wearable device does not have unlimited access privileges. In an embodiment, the user of the wearable device interacts with such an external device, but the interaction is limited and/or controlled. For example, the external device may include a smart device, such as a smart phone, of another user, a wearable device of the other user, a wireless fidelity (WiFi) router, and a payment device. The external device may include a near field communication (NFC) device, for example, a smart device to which NFC is applied, capable of performing NFC with the wearable device. However, these examples are not intended to be limiting examples, and other embodiments use other types of external devices. External devices may use a variety of wireless communications technology and protocols, such as Wi-Fi, cellular technologies such as 3G and 4G technologies, and short-range wireless technologies such as Bluetooth and NFC.

In operation 120, in an embodiment, the wearable device is set to perform the wireless communication with the external device, and is also set to perform the wireless communication with the external device based on the recognized gesture. Also, at least one external device to perform the wireless communication is discovered and the external device to perform the wireless communication with the wearable device is selected from among the at least one external device identified in the discovery process. The external device to perform the wireless communication with the wearable device may be selected from among the found at least one external device based on the recognized gesture. Thus, as will be discussed further, different recognized gestures may invoke different interactions between the wearable device and various external devices.

Although operations 110 and 120 are illustrated as being sequentially performed in FIG. 1, operations 110 and 120 may also be simultaneously performed. Operation 120 is further described in FIG. 2.

In operation 130, the method establishes wireless communication connection with at least one of the external device and the internal device based on the recognized gesture. The internal device may refer to a device that the user of the wearable device has full control over. For example, the internal device may include a smart device owned by the user, such as a smart phone, and a storage of the user of the wearable device included in or communicatively coupled to the wearable device. Because an internal device, as discussed above, is owned by the user, the user has full access privileges and total control over such an internal device. Therefore, the wearable device is provided access to the full functionality of an internal device, while the wearable device's access to an external device is controlled and limited.

In operation 130, the wearable device identifies a predetermined gesture that is mapped to the recognized gesture, and establishes the wireless communication connection with at least one of the external device and the internal device based on the predetermined gesture, as identified. For example, the predetermined gesture corresponds to at least one function that is to be executed in response to the recognized gesture.

In an example embodiment, a gesture of the user where the user moves the wrist from side to side is set to correspond to a communication start function and a communication device setting function, and a gesture of the user moving the wrist up and down is set to correspond to a communication connection setting function. In this example, when the gesture of the user moving the wrist from side to side is recognized based on the sensed motion and biosignal, the wearable device identifies that the communication start function and the communication device setting function are being invoked by mapping the recognized gesture and the predetermined gesture to one another in operation 130. By mapping the recognized gesture and the predetermined gesture to one another, the wearable device is able to establish which function or functions the user intends to invoke with a gesture. Similarly, when the gesture of the user moving his or her wrist up and down is recognized based on the sensed motion and the biosignal, the wearable device may establish the wireless communication connection with at least one of the external device and the internal device, because of the mapping between a user moving his or her wrist up and down and establishing a communication connection.

According to an embodiment, the wearable device identifies, from among a plurality of communication schemes, a communication scheme used to perform wireless communication with at least one of the external device and the internal device, and establishes a wireless communication connection with at least one of the external device and the internal device using the identified communication scheme in operation 130. The plurality of communication schemes may include an NFC scheme, a wireless fidelity (WiFi) communication scheme, an infrared (IR) communication scheme, a cellular communication scheme, such as 3G or 4G, and a Bluetooth communication scheme. The plurality of communication schemes may include a plurality of communication protocols. However, the communication schemes listed are only examples of wireless communication schemes and protocols used to establish a wireless communication connection, and other appropriate wireless communication technologies may be used. Additionally, embodiments do not require that the communication connection be entirely wireless, and in some embodiments a portion of the communication connection between the wearable device and the external device or the internal device may use a wired communication connection.

According to another embodiment, the wearable device identifies data used to perform wireless communication with at least one of the external device and the internal device based on the recognized gesture, and establishes a wireless communication connection with at least one of the external device and the internal device based on the identified data in operation 130. In this embodiment, the data indicates all of the data that may be transmitted and received between the wearable device and at least one of the external device and the internal device. For example, in one use case, when the user makes a payment using the wearable device, the wearable device identifies data to be exchanged with the external device as payment data by recognizing the gesture of the user, and establishes the wireless communication connection with the external device based on the identified data. In this example, payment data may include information such as credit card information providing funds for a purchase transaction.

According to still another embodiment, the wearable device obtains information used for the wireless communication connection from the external device and the internal device based on the recognized gesture, and establishes the wireless communication connection with the external device and the internal device based on the obtained information so as to enable the wireless communication between the external device and the internal device in operation 130.

In an example, the user carries the wearable device and the internal device together on the user's person. Additionally, the user may desire a direct communication between the internal device and the external device. In this example, the wearable device obtains information associated with the external device, information associated with the internal device, and information used to connect the internal device and the external device based on the recognized gesture performed by the user, and establishes the wireless communication connection with the external device and the internal device based on the obtained information.

As an example of the data sharing discussed above, a purchase transaction may take place if the user holds the wearable device in proximity to a tag identifying an item to be purchased, gathers information identifying the item using an appropriate sensor, and then performs a gesture indicating that he or she wishes to purchase that item.

In operation 140, the method performs wireless communication with at least one of the external device and the internal device with which the wireless communication connection is established. When the wireless communication connection between the wearable device and the internal device is established, the wireless communication between the wearable device and the internal device is performed based on settings. For example, the settings may be derived from the interaction between the wearable device and the internal device, as discussed above. Accordingly, the user may use data or settings information stored in the internal device and may further conveniently use the wearable device as part of the execution of a function of the internal device.

The wireless communication between the wearable device and the internal device may be simultaneously conducted during the performance of operations 110 through 130. Accordingly, even if the wearable device includes within itself only a low capacity memory or has low computing power, an embedded memory or a processor of the internal device may be used to supplement the computing resources of the wearable device itself.

According to an embodiment, the wearable device performs wireless communication with the external device and the internal device based on settings of the wireless communication connection, and sets data received from the external device to be stored in the internal device in operation 140. By transferring information from the external device to be stored in the internal device, the information becomes more conveniently accessible for use by the wearable device.

Also in such an embodiment, the wearable device loads data from the internal device, and may perform the wireless communication with the external device based on the loaded data. Here, the loaded data may include information associated with at least one of the user of the wearable device, settings of the wireless communication connection, the wearable device itself, and the internal device itself.

According to an embodiment, the communication method using the wearable device enables a user to perform wireless communication with a user of at least one of an external device and an internal device through feedback, where feedback is information provided by the wearable device in response to input, such as the information discussed above that includes user movement and user biosignals. For example, the communication method using the wearable device may feed back, to the user in a visual, auditory, or tactile manner, information associated with at least one of a function corresponding to an input gesture, the wearable device, the external device, and the internal device. Thus, the feedback is a way for the wearable device to output information that the user may consider when providing further input.

Accordingly, the user, after receiving the feedback, inputs a gesture based on the fed back information. As discussed above, feedback includes visual, auditory, or tactile information. A visual feedback refers to a feedback that is provided using a display included in the wearable device or may refer to a feedback that is provided using a display of the internal device and/or the external device in communication with the wearable device. An auditory feedback refers to a feedback that is provided in a form of sound, such as through a speaker unit of the wearable device or a speaker unit of the internal device or the external device. For example, the speaker unit may be a loudspeaker, but it may also include a group of loudspeakers or speakers that are incorporated into a pair of headphones or a single headphone. A tactile feedback refers to a feedback that is provided in a tactile form, such as through a vibrating unit of the wearable device or a vibrating unit of the internal device or the external device. Feedback is not limited to these examples, and may include any sensory phenomena produced by the wearable device, the internal device, or the external device, or any peripheral of these devices that is able to produce an event that is observable by the user FIG. 2 illustrates an example of operation 120 of FIG. 1, according to an embodiment.

Figure 2:
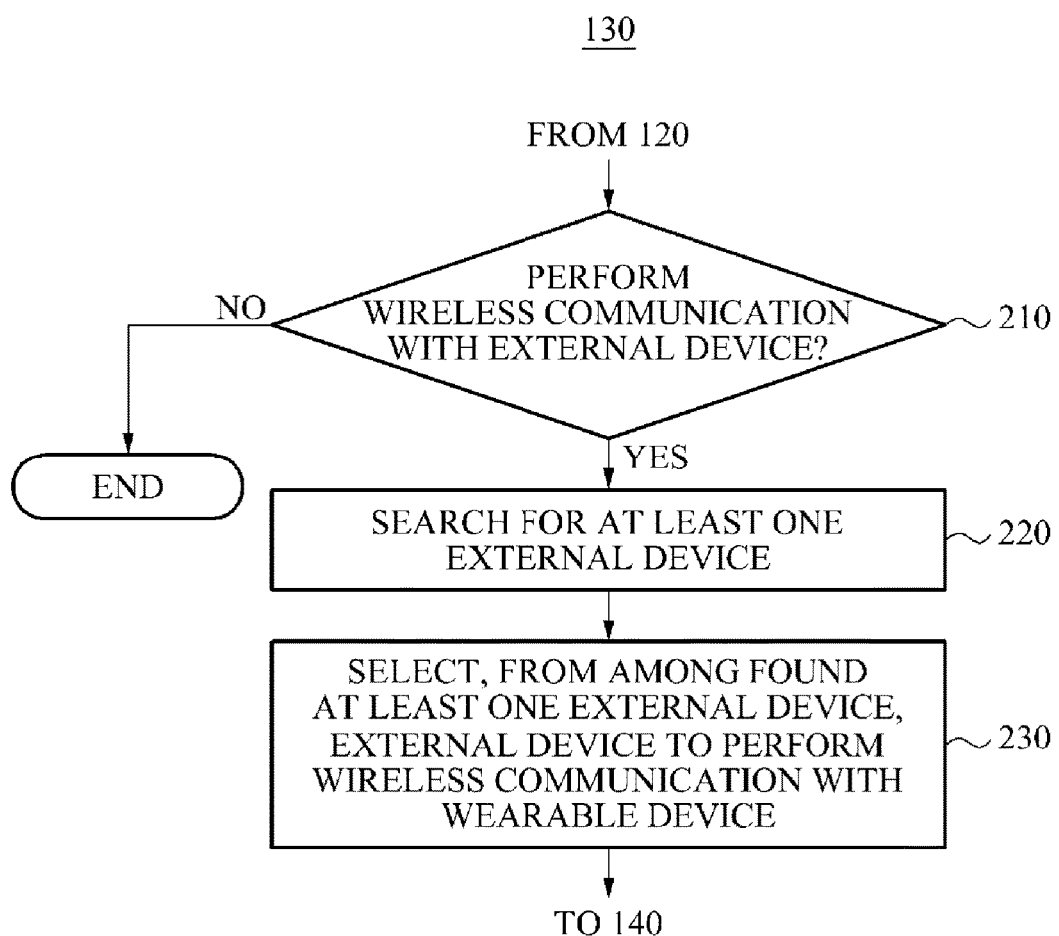
FIG. 2 is a flowchart illustrating an example of an operation of recognizing an external device of FIG. 1, according to an embodiment.

Referring to FIG. 2, operations 110 and 120 of FIG. 1 are sequentially performed or are simultaneously performed. Accordingly, a case in which operations 110 and 120 are sequentially performed and a case in which operations 110 and 120 are simultaneously performed are separately described.

In the case in which operations 110 and 120 are sequentially performed, in operation 210 the method determines whether to perform wireless communication with the external device. In an example, the wearable device is set to perform the wireless communication with the external device based on the recognized gesture. In this example, the wearable device is set to identify a predetermined gesture that is mapped to the recognized gesture as discussed above, and perform the wireless communication with the external device according to a function corresponding to the predetermined gesture.

In this embodiment, when the wearable device is not set to perform the wireless communication with the external device, the wireless communication with the external device is performed until a subsequent gesture is recognized that indicates that wireless communication with the external device is to be performed.

When the wearable device is set to perform the wireless communication with the external device, at least one external device is searched for in operation 220. For example, the search may be carried out by performing a discovery process that identifies potential external devices with which communication is possible. In this example, the wearable device searches for at least one external device based on a distance between the wearable device and the at least one external device, such as by searching for potential external device within a certain radius. In another example, the wearable device searches for the at least one external device using a list of external devices. However, an embodiment may use any search process that allows the wearable device to establish wireless communication with an external device.

In operation 230, the method selects an external device to perform the wireless communication with the wireless device from among the found at least one external device. For example, the wearable device selects, from among the found at least one external device, the external device to perform the wireless communication based on the recognized gesture. In some example situations, two external devices including a first external device and a second external device are found. In such an example, the wearable device may be set to select the first external device in response to a gesture A input from the user, and to select the second external device in response to a gesture B input from the user. In this example, when the wearable device recognizes the gesture B, the wearable device selects the second external device as the external device to perform the wireless communication.

In the alternative case, in which operations 110 and 120 are simultaneously performed, whether to perform the wireless communication with the external device is determined in operation 210. In this example, the wearable device determines whether to perform the wireless communication with the external device based on predetermined settings, and receives, from the user, settings on whether to perform the wireless communication with the external device.

When the wearable device is set to perform the wireless communication with the external device, at least one external device is searched for in operation 210. In this example, similar to the case in which operations 110 and 120 are sequentially performed, the wearable device searches for at least one external device. Similar to the case in which operations 110 and 120 are sequentially performed, the search may be based on a distance between the wearable device and the at least one external device and may also be based on a search for the at least one external device using a list of external devices.

In operation 230, the method selects the external device to perform the wireless communication with the wireless device from among the found at least one external device. In this example, the wearable device selects, from among the found at least one external device, the external device to perform the wireless communication with the wearable device based on the distance or another criteria used to choose which external device to communicate with. Further, the wearable device may select the external device to perform the wireless communication based on predetermined settings. In one example, the wearable device receives, from the user, settings related to a selection of the external device to perform the wireless communication.

Figure 3:
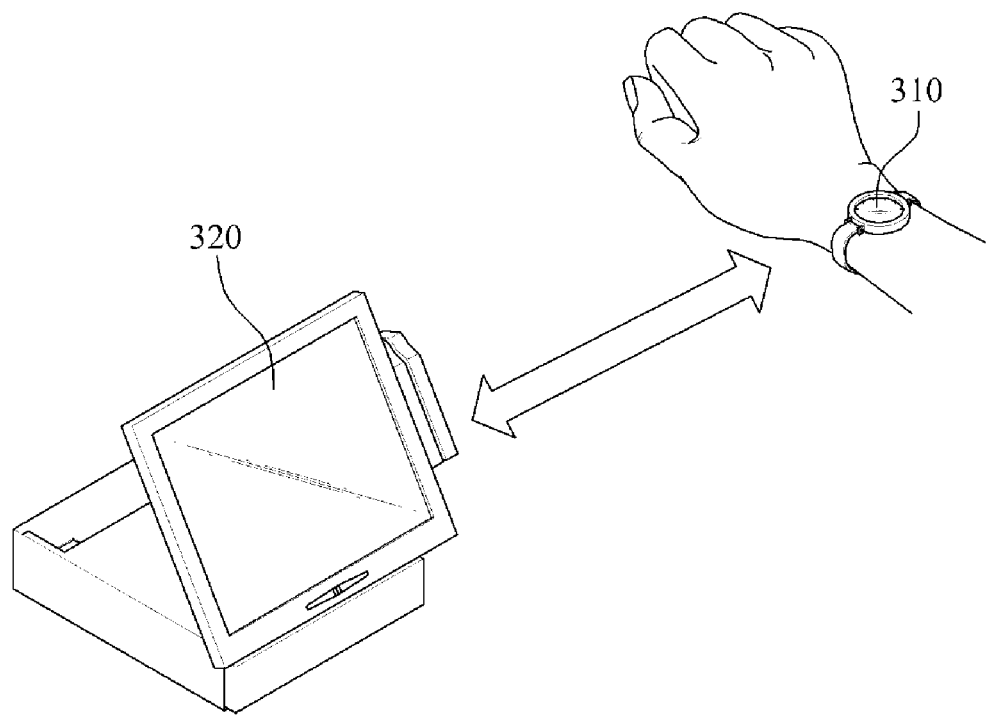
FIG. 3 is a diagram describing an example of a communication method using a wearable device, according to an embodiment.

FIG. 3 illustrates a diagram describing an example of a communication method using a wearable device 310, according to an embodiment.

Referring to FIG. 3, in an example the wearable device 310 processes a payment. The payment is processed using a card, such as a credit or debit card, through wireless communication with an external device 320. The external device 320 may be a payment device.

In a case in which a gesture A is set as a gesture to process a payment using a card with the external device 320 as discussed above, the wearable device 310 performs a payment function in response to recognition of the gesture A. For example, when the wearable device 310 is situated to be near to the external device 320, the wearable device 310 recognizes the external device 320 due to proximity. The wearable device 310 may also recognize the external device 320 through gesture recognition. For example, the wearable device 310 may detect a certain gesture and establish which external device 320 to use based on which specific gesture is identified.

During a card payment process, the wearable device 310 identifies card data used to perform the wireless communication with the external device 320 from among a plurality of sets of card data using the gesture recognition. In this example, the plurality of sets of card data may be stored in the wearable device 310 and may also be stored in an internal device (not shown) of, for example, a smart phone, which performs the wireless communication with the wearable device 310. The card data is be stored in the wearable device 310 and/or the internal device because these are devices that belong to the user. Because the user owns the devices, it is appropriate to store private information such as credit or debit card data in these devices, because it is assumed that only the user whose data is stored in the devices will have access to the devices.

When the plurality of sets of card data is stored in the internal device, the wearable device 310 may receive the plurality of sets of card data from the internal device through the wireless communication with the internal device. The wearable device 310 may identify, from among a plurality of communication schemes, a communication scheme used to perform the wireless communication with the external device 320 using the gesture recognition. Example communication schemes have been presented above, and as discussed above any appropriate communication scheme may be used in an appropriate embodiment.

For example, when three sets of card data are stored in the wearable device 310, the wearable device 310 and the external device 320, one embodiment uses three communication schemes, one scheme for each set of card data. That is, a gesture A is set to identify a first set of card data and a first communication scheme, a gesture B is set to identify a second set of card data and a second communication scheme, and a gesture C is set to identify a third set of card data and a third communication scheme. In this example, in response to recognition of the gesture C, the wearable device 310 communicates with the external device 320 using the third communication scheme and may transmit the third set of card data to the external device 320. Through the above procedure, the card payment process is performed.

Figure 4:
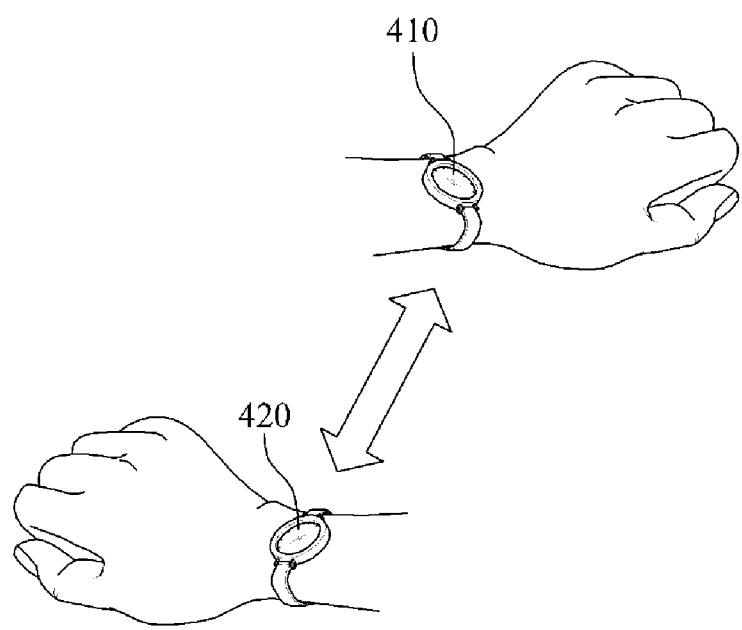
FIG. 4 is a diagram describing another example of a communication method using a wearable device, according to an embodiment.

FIG. 4 illustrates a diagram describing another example of a communication method using a wearable device 410, according to an embodiment.

Referring to FIG. 4, the wearable device 410 performs wireless communication to interact and exchange information with a wearable device 420 of another user.

When the wearable device 410 and the wearable device 420 are positioned in a near field of one another, the wearable device 410 and the wearable device 420 may recognize each other. Alternatively, the wearable device 410 and the wearable device 420 may be able to communicate with each other through another wireless technology, such as Bluetooth. When the wearable device 410 recognizes a gesture set to perform wireless communication with the wearable device 420, the wearable device 410 transmits a wireless communication setting request to the wearable device 420. When the wearable device 420 receives the wireless communication setting request from wearable device 410 and then, recognizes a gesture set by the user of the wearable device 420 to perform the wireless communication with the wearable device 410, a wireless communication connection may be established between the wearable device 410 and the wearable device 420 and data may be exchanged between them. For example, the wearable device 410 and the wearable device 420 may exchange necessary transmissions in order to establish a wireless communication connection.

Figure 5:
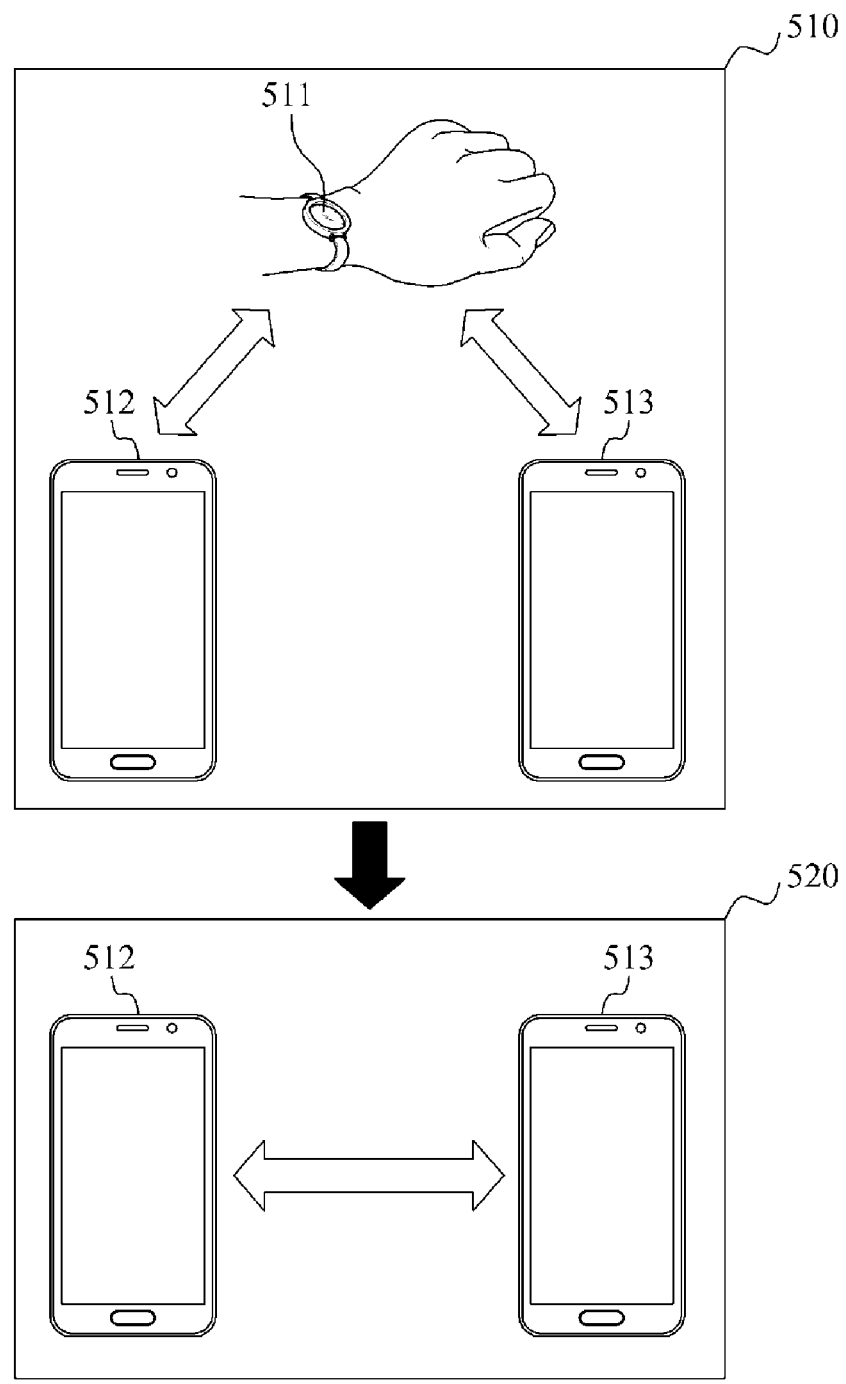
FIG. 5 is a diagram describing still another example of a communication method using a wearable device, according to an embodiment.

FIG. 5 illustrates a diagram describing still another example of a communication method using a wearable device 511, according to an embodiment.

Referring to FIG. 5, the wearable device 511 establishes a wireless communication connection to enable wireless communication between an internal device 512 and an external device 513. For example, in FIG. 5, the internal device 512 and the external device 513 are both shown, for purposes of illustration, as smart phones.

Specifically, referring to a block 510, the wearable device 511 obtains information used for a wireless communication connection from the internal device 512 and the external device 513. For example, when the wearable device 511 recognizes a gesture performed by the user using the wearable device 511 as being set to connect the internal device 512 and the external device 513 around the external device 511, the wearable device 511 obtains information used for the wireless communication connection from the internal device 512 and the external device 513 in order to connect the internal device 512 and the external device 513. Information used for the wireless communication connection may include information associated with the internal device 512 and the external device 513 and information associated with a communication right. Such information provides information about the logistics of how to establish the location as well as information that may be used for authentication and security purposes.

For example, when information used for the wireless communication connection is obtained from the internal device 512 and the external device 513, the wearable device 511 controls a connection between the internal device 512 and the external device 513 based on the obtained information so as to enable the wireless communication between the internal device 512 and the external device 513. Accordingly, as illustrated in a block 520, the internal device 512 and the external device 513 directly communicate with each other without using the wearable device 511 once the connection has been established in block 510, as has just been discussed.

According to another example embodiment, in a case in which an external device is a WiFi router, when the wearable device is positioned within a coverage area of the WiFi router, the wearable device recognizes the WiFi router and attempts to establish a communicative connection as discussed above. In this example, when a plurality of WiFi routers is present, several ways of choosing a router are used in various embodiments. In one embodiment, the wearable device selects a WiFi router from among the plurality of WiFi routers based on a recognized gesture. Another embodiment selects a WiFi router from among the plurality of WiFi routers based on predetermined information, and also selects a WiFi router to perform the wireless communication based on a strength of a signal. When the WiFi router is recognized, the wearable device may recognize a gesture and may set the recognized WiFi router to perform the wireless communication with an internal device. To this end, the wearable device obtains a function used for the wireless communication connection from the internal device and the WiFi router, and establishes the wireless communication connection with the internal device and the WiFi router based on the obtained information. Accordingly, the internal device may be directly connected to the WiFi router, without the involvement of the wearable device 511.

Figure 6:
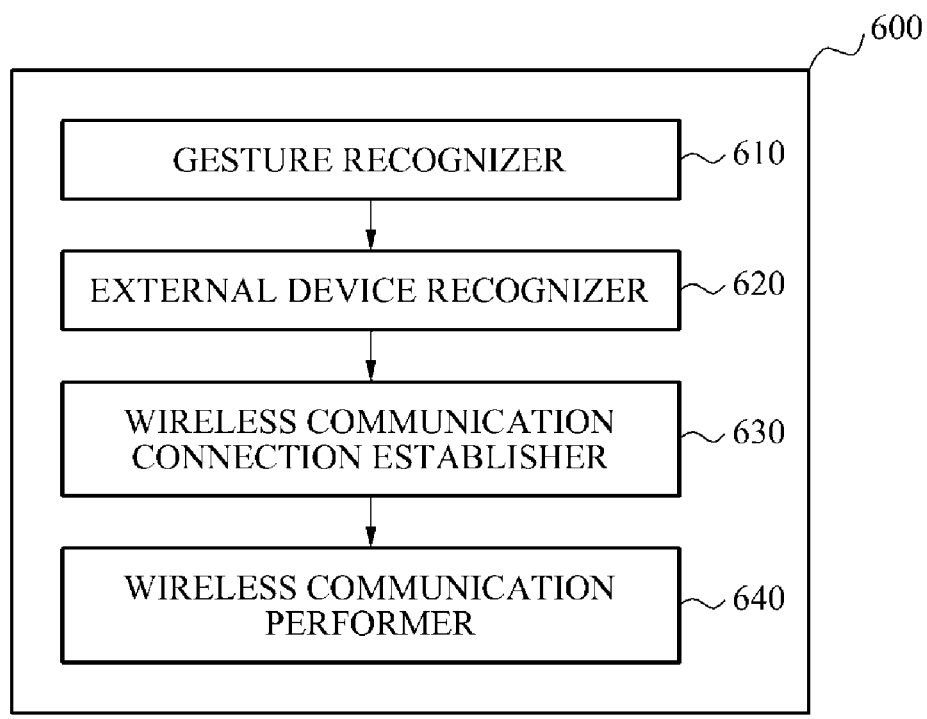
FIG. 6 is a block diagram illustrating an example of a wearable device, according to an embodiment.

FIG. 6 illustrates an example of a wearable device 600, according to an embodiment. Referring to FIG. 6, the wearable device 600 includes a gesture recognizer 610, a wireless communication connection establisher 630, and a wireless communication performer 640.

The gesture recognizer 610 is configured to recognize a gesture of a user by sensing a motion and a biosignal that occur in or around a portion to which the wearable device 600 is attached. The nature of the motion and the biosignal, as well as how sensors detect and analyze the motion and the biosignal, are discussed further above.

The wireless communication connection establisher 630 is configured to establish a wireless communication connection with at least one of an external device and an internal device based on the recognized gesture. The operation of the wireless communication connection establisher 630 is discussed further above.

The wireless communication performer 640 is configured to perform wireless communication with at least one of the external device and the internal device with which the wireless communication connection is established. The operation of the wireless communication performer 640 is discussed further above.

The wearable device 600 further includes an external device recognizer 620 configured to recognize an external device to perform wireless device with the wearable device 600. The operation of the external device recognizer 620 is discussed further above.

Description made above with reference to FIG. 1 through FIG. 5 may be applied to the wearable device 600 of FIG. 6 and thus, a further detailed description will be omitted.

The examples of a wearable device may improve the ability of a user to use gestures to communicate with an internal device or external device to allow the wearable device, internal device, and/or external device to perform helpful tasks for the user.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method using a wearable device, comprising:
    recognizing a gesture of a user by sensing at least one of a motion and a biosignal that occur in or around a portion of the user to which the wearable device is attached;
    establishing a wireless communication connection for the wearable device with either one or both of an external device and an internal device based on the recognized gesture, wherein the wearable device has a greater control over a functionality of the internal device than a functionality of the external device;
    receiving data corresponding to the recognized gesture from the internal device in response to recognizing the gesture, the data being stored in the internal device; and
    establishing a direct wireless communication connection between the internal device and the external device, not through the wearable terminal, by transmitting the received data to the external device,
    wherein the received data includes information necessary to establish a wireless communication connection with the internal device.

2. The method of claim 1, wherein the recognizing comprises:
    authenticating the user based on the biosignal; and
    recognizing the gesture of the user by sensing the motion and the biosignal when the user is authenticated.

3. The method of claim 1, wherein the recognizing comprises sensing the motion using at least one of an acceleration sensor, a gyro sensor, and a camera.

4. The method of claim 1, wherein the recognizing comprises sensing the biosignal using at least one of an electromyogram (EMG) sensor, an electrocardiogram (ECG) sensor, an electroencephalogram (EEG) sensor, and a temperature sensor.

5. A non-transitory computer-readable storage medium storing a program for a communication method using a wearable device, the program comprising instructions for causing a computer to perform the method of claim 1.

6. The method of claim 1, further comprising:
performing wireless communication by the wearable device with the at least one of the external device and the internal device with which the wireless communication connection is established.

7. The method of claim 6, further comprising:
identifying a predetermined gesture that is mapped to the recognized gesture; and
establishing the wireless communication connection with the either one or both of the external device and the internal device based on the predetermined gesture,
wherein the predetermined gesture corresponds to at least one function set to be executed in response to the recognized gesture.

8. The method of claim 6, further comprising:
recognizing the external device to perform the wireless communication with the wearable device.

9. The method of claim 8, wherein the recognizing the external device comprises:
searching for at least one external device to perform wireless communication to identify a found at least one external device; and
selecting, from among the found at least one external device, an external device to perform the wireless communication with the wearable device.

10. The method of claim 9, wherein the selecting comprises
selecting, from among the found at least one external device, an external device to perform the wireless communication with the wearable device based on the recognized gesture.

11. The method of claim 8, further comprising:
setting the wearable device to perform the wireless communication with the external device based on the recognized gesture.

12. The method of claim 6, wherein the establishing comprises:
identifying, from among a plurality of communication schemes, a communication scheme used to perform the wireless communication with at least one of the external device and the internal device based on the recognized gesture; and
establishing the wireless communication connection with the either one or both of the external device and the internal device based on the identified communication scheme.

13. The method of claim 6, wherein the establishing comprises:
identifying data used to perform the wireless communication with at least one of the external device and the internal device based on the recognized gesture; and
establishing the wireless communication connection with the either one or both of the external device and the internal device based on the identified data.

14. The method of claim 6, wherein the establishing comprises:
obtaining information used for a wireless communication connection between the external device and the internal device based on the recognized gesture; and
establishing the wireless communication connection between the external device and the internal device based on the obtained information to enable the wireless communication between the external device and the internal device.

15. The method of claim 6, wherein the performing comprises selecting data received from the external device to be stored in the internal device.

16. The method of claim 6, wherein the performing comprises:
loading data from the internal device; and
performing the wireless communication with the external device based on the loaded data,
wherein the loaded data comprises information associated with at least one of a user of the wearable device, establishment of the wireless communication connection, the wearable device, and the internal device.

17. The method of claim 6, wherein the wireless communication with the external device is near field communication between the wearable device and the external device.

18. The method of claim 6, further comprising:
feeding back, to the user, in a visual, auditory, or tactile manner, information associated with at least one of a function corresponding to the recognized gesture, a state of wireless communication with at least one of the external device and the internal device, the wearable device, the external device, and the internal device.

19. The method of claim 1, wherein the establishing comprises:
establishing the wireless communication connection with the external device by transmitting the received data to the external device.

20. The method of claim 19,
wherein the received data comprises information associated with at least one of the user, the internal device, an authentication for the wireless communication connection with the external device.

21. A wearable device, comprising:
a gesture recognizer configured to recognize a gesture of a user by sensing at least of a motion and a biosignal that occur in or around a portion of the user to which the wearable device is attached; and
a wireless communication connection establisher configured to:
establish a wireless communication connection for the wearable device with either one or both of an external device and an internal device based on the recognized gesture, wherein the wearable device has a greater control over a functionality of the internal device than a functionality of the external device;
receive data corresponding to the recognized gesture from the internal device in response to recognizing the gesture, the data being stored in the internal device; and
establish a direct wireless communication connection between the internal device and the external device, not through the wearable terminal, by transmitting the received data to the external device,
wherein the received data includes information necessary to establish a wireless communication connection with the internal device.

22. The wearable device of claim 21, further comprising:
a wireless communication performer configured to perform wireless communication by the wearable device with the at least one of the external device and the internal device with which the wireless communication connection is established.

23. The wearable device of claim 22, further comprising:
an external device recognizer configured to recognize the external device to perform the wireless communication with the wearable device.

24. A communication method using a first wearable device, comprising:
- recognizing a gesture of a user by sensing at least one of a motion and a biosignal that occur in or around a portion of the user to which the first wearable device is attached;
- searching for a second wearable device to identify a found second wearable device; and
- establishing a wireless communication connection between the first wearable device and the second wearable device, and
- wherein the establishing comprises:
  - receiving data corresponding to the recognized gesture from an internal device in response to recognizing the gesture, the data being stored in the internal device; and
  - establishing a direct wireless communication connection between the internal device and the second wearable device, not through the wearable terminal, by transmitting the received data to the second wearable device,
- wherein the first wearable device has a greater control over a functionality of the internal device than a functionality of the second wearable device, and
- wherein the received data includes information necessary to establish a wireless communication connection with the internal device.

25. The method of claim 24, further comprising:
performing wireless communication by the first wearable device with the second wearable device.

26. The method of claim 25, wherein the establishing comprises:
- identifying, from among a plurality of communication schemes, a communication scheme used to perform the wireless communication with the second wearable device based on the recognized gesture; and
- establishing the wireless communication connection with the second wearable device based on the identified communication scheme.

27. The method of claim 25, wherein the establishing comprises:
- identifying data used to perform the wireless communication with the second wearable device based on the recognized gesture; and
- establishing the wireless communication connection with the second wearable device based on the identified data.

28. The method of claim 25, wherein the wireless communication between the first wearable device and the second wearable device is near field communication between the first wearable device and the second wearable device.

* * * * *